(No Model.)

F. & J. A. CRICH.
TELEGRAPH WIRE JOINTER.

No. 246,086. Patented Aug. 23, 1881.

WITNESSES:
C. Neveux
C. Sedgwick

INVENTOR:
F. Crich
J. A. Crich
BY Munn & Co
ATTORNEYS.

UNITED STATES PATENT OFFICE.

FREDERICK CRICH, OF JOHNSTOWN, PENNSYLVANIA, AND JOHN A. CRICH, OF NAUGATUCK, CONNECTICUT, ASSIGNORS TO HENRY ROBERTS, OF ALLEGHENY CITY, PENNSYLVANIA.

TELEGRAPH-WIRE JOINTER.

SPECIFICATION forming part of Letters Patent No. 246,086, dated August 23, 1881.

Application filed March 19, 1881. (No model.)

*To all whom it may concern:*

Be it known that we, FREDERICK CRICH, of Johnstown, in the county of Cambria and State of Pennsylvania, and JOHN A. CRICH, of Naugatuck, in the county of New Haven and State of Connecticut, have invented a new and Improved Telegraph-Wire Jointer, of which the following is a full, clear, and exact description.

The object of this invention is to provide a simple and convenient machine or tool for more securely and quickly uniting the ends of telegraph-wires.

The invention consists of a mechanism for joining telegraph-wires containing the following elements—namely, a pair of fixed longitudinally-slotted screws, each carrying a longitudinally-slotted nut, provided with an end stud, and a slotted standard set midway between the nuts, all operated substantially as hereinafter set forth, it being designed to lay the opposite ends of the wire in the slots of the nuts and screws, so that said ends shall overlap each other, and to bend their extremities at right angles, so as to take against the end studs of the said nuts, and then by revolving the said nuts to twist the ends of the wires about each other, all of which will be hereinafter set forth.

Figure 1:
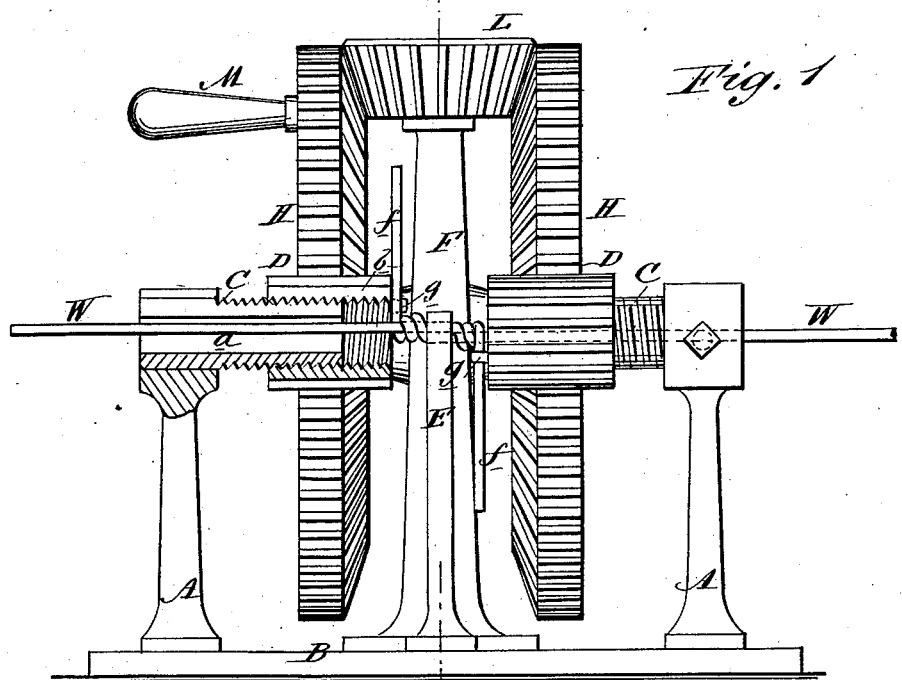
Figure 2:
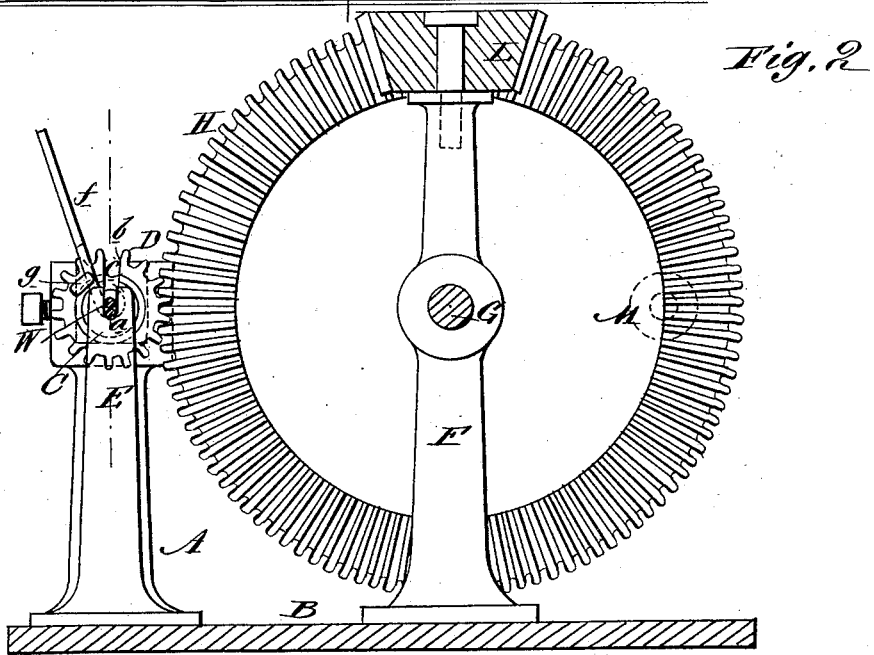

Figure 1 is a front elevation of the device, partly in section, showing the manner of jointing the wires. Fig. 2 is a sectional side elevation of the same.

Similar letters of reference indicate corresponding parts.

In the drawings, A A represent two standards fixed opposite each other on a base, B. In the top of these standards A are firmly fixed two horizontal screws, C C, that extend inward toward each other. A groove or slot, *a*, extending the whole length of each screw C is cut in it through its upper face to its axis for receiving the end of a wire that is to be jointed. On the inner ends of these screws C C are fitted the nuts D D, which are also longitudinally grooved or slotted, as shown at *b*, from periphery to axis for receiving the wires. These nuts D D may be operated by hand, but for greater convenience in joining stout wires I prefer to move them by suitable mechanism, and for this purpose have in this case provided them with peripheral teeth and geared them with toothed wheels, as shown.

In a line with the standards A A, and centrally between the ends of nuts D D, is a standard, E, springing from the base B, and having in its top a groove or slot, *c*, for the entrance of the wires to be jointed.

In the rear of the standard E is a larger standard, F, supported on the base B, and serving as a support for the horizontal shaft G, which carries on each end a large cog-wheel, H, which cog-wheels H are designed for convenience to have five times the number of peripheral teeth that are on the nuts D D, so that one revolution of the wheel H will cause the nuts D D with which they are geared to make five revolutions.

On the top of the standard F is journaled a bevel-gear wheel, L, that gears on either side with the beveled toothed inner rims of the wheel H, so that when the one wheel H is revolved by means of its attached handle M, or by any other means, the motion is transmitted in a reverse direction to the other wheel H by the bevel-gear L.

The wires W to be jointed have first their extremities bent at right angles, as shown at *f*, and said wires are then laid in the slots *a* of the screws C through the slots *b* of the nuts D, which nuts D are run in opposite directions toward the standard E, and with their slots *b* uppermost, so that the bent end *f* of each of said wires W shall take against the stud *g*, which projects from the inner end of the opposite nut, D, and so that said wires W shall overlap each other within the slot *c* in the top of the standard E. The wheels H and bevel-gear L are then revolved by means of the handle M with the effect of revolving the nuts D in opposite directions, so that they move from each other, whereby the ends of the wire W are twisted about each other, as shown, the slot *c* in the standard C holding the said wires W, so that their ends on either side of it shall be twisted evenly and alike.

This machine or tool is cheap of construction and can be conveniently handled and applied by one person.

When the wires W are jointed the nuts D D are turned until their slots *b* are vertically over the slots *a* of the screw C. The said wires W are then removed therefrom, the nuts D D are then moved toward each other by the action of the gears K L, and the machine is then ready for other wires.

Having thus described our invention, what we claim as new, and desire to secure by Letters Patent, is—

1. A mechanism for joining telegraph-wires containing the following elements, namely: a pair of stationary longitudinally-slotted screws, each carrying a longitudinally-slotted nut provided with an end stud, and a slotted standard set midway between the nuts, all operated substantially as herein described.

2. In a telegraph-wire jointer, the combination, with the stationary longitudinally-slotted screws C C, of the longitudinally-slotted nuts D D, provided with end studs, *g*, substantially as herein shown and described.

3. In a telegraph-wire jointer, the combination, with the stationary longitudinally-slotted screws C C and longitudinally-slotted nuts D D, provided with studs *g*, of the slotted standard E, substantially as and for the purpose described.

4. In a telegraph-wire jointer, the combination, with the stationary slotted screws C C and slotted nuts D D, provided with studs *g*, and slotted standards E, of the gear-wheels H L, substantially as herein shown and described, whereby said jointer is operated, as set forth.

FREDERICK CRICH.
JOHN A. CRICH.

Witnesses as to signature of Frederick Crich:
A. MONTGOMERY,
ANDREW GARD.

Witnesses as to signature of John A. Crich:
H. C. BALDWIN,
HERMAN WM. VILLER.